INVENTOR.
F. W. KARASEK

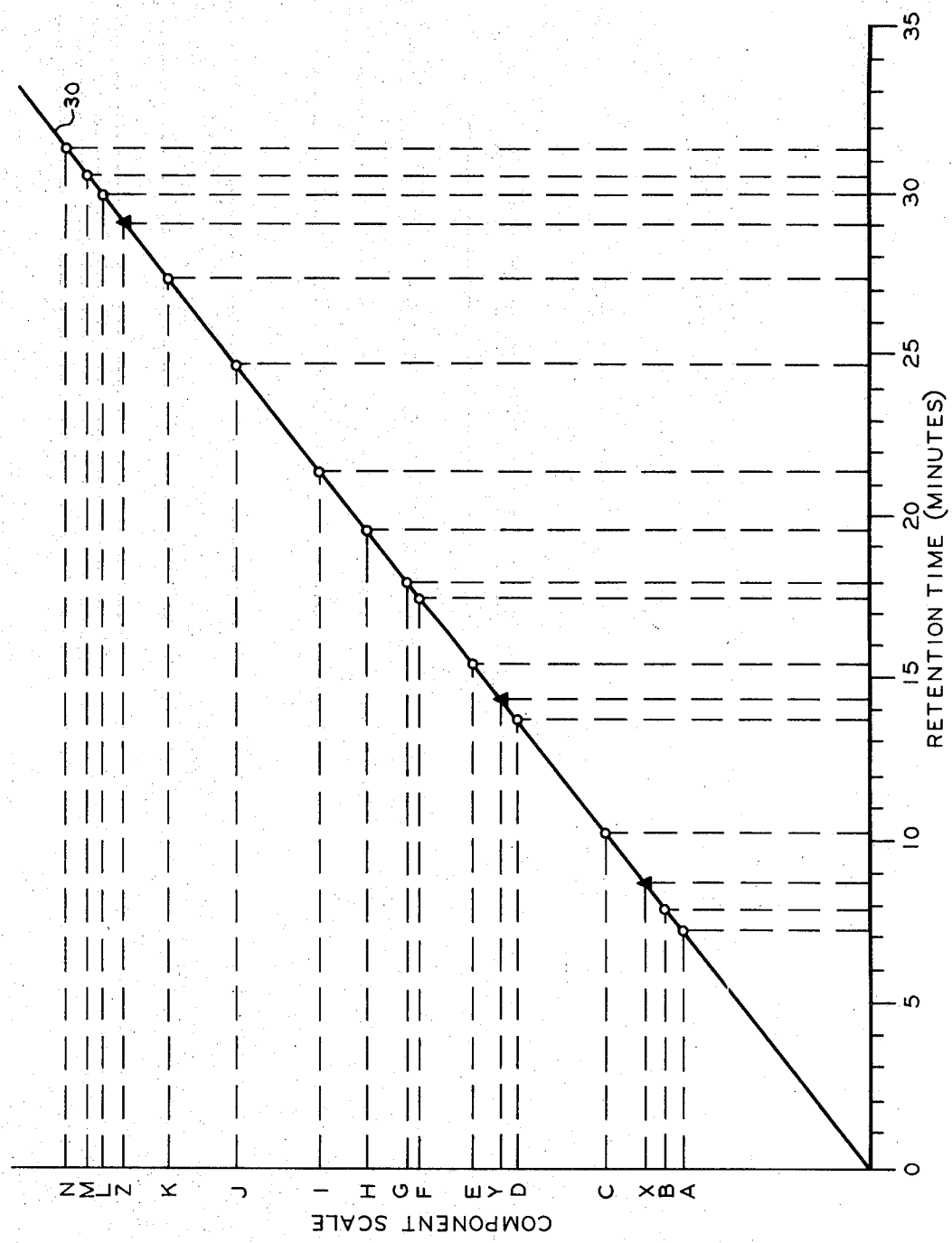

United States Patent Office 3,559,455
Patented Feb. 2, 1971

3,559,455
CHROMATOGRAPHIC ANALYSIS
Francis W. Karasek, Waterloo, Ontario, Canada, assignor to Phillips Petroleum Company, a corporation of Delaware
Filed Oct. 30, 1968, Ser. No. 771,785
Int. Cl. G01n 31/08
U.S. Cl. 73—23.1
5 Claims

ABSTRACT OF THE DISCLOSURE

In order to identify components in the effluent from a chromatographic column, a reference material is introduced into the column with the sample. The column effluent is split and passed to a conventional detector and to a detector which is capable of selectively measuring components of the reference material. The output signals from the two detectors are compared so that sample components can be identified by their retention times with respect to the reference material.

---

Various types of chromatographic analyzers have been developed in recent years for the analysis of fluid mixtures. A sample of the material to be analyzed is introduced into a column, and carrier gas is passed through the column to elute the constituents of the sample in sequence. When complex mixtures are to be analyzed, it is often quite difficult to make positive identification of individual constituents in the column effluent. This can occur because changes in operating conditions of the column change the retention times of the components. While efforts are usually made to maintain the operating conditions constant, even minor changes in temperature, flow rates and the like can shift the retention times of the peaks.

In accordance with this invention a method is provided for identifying individual peaks in the analyzer output signal, regardless of changes which may occur in operating conditions of the analyzer. This is accomplished by introducing a reference material into the analyzer with the sample. The column effluent is split and passed to two separate detectors. One of the detectors is a conventional detector which is capable of detecting the individual constituents of the sample mixture. The second detector is one which provides a positive identification of the constituents of the reference material. The output of the second detector thus provides one or more reference points which permit positive identification to be made of the retention times of the reference material components. By comparing the reference detector output with the output of the conventional detector, it is possible to calibrate the instrument so that positive identification of each component of the sample can be made as a function of the retention time of that component.

Accordingly, it is the object of this invention to provide improved methods of analyzing materials by chromatography.

Figure 1:
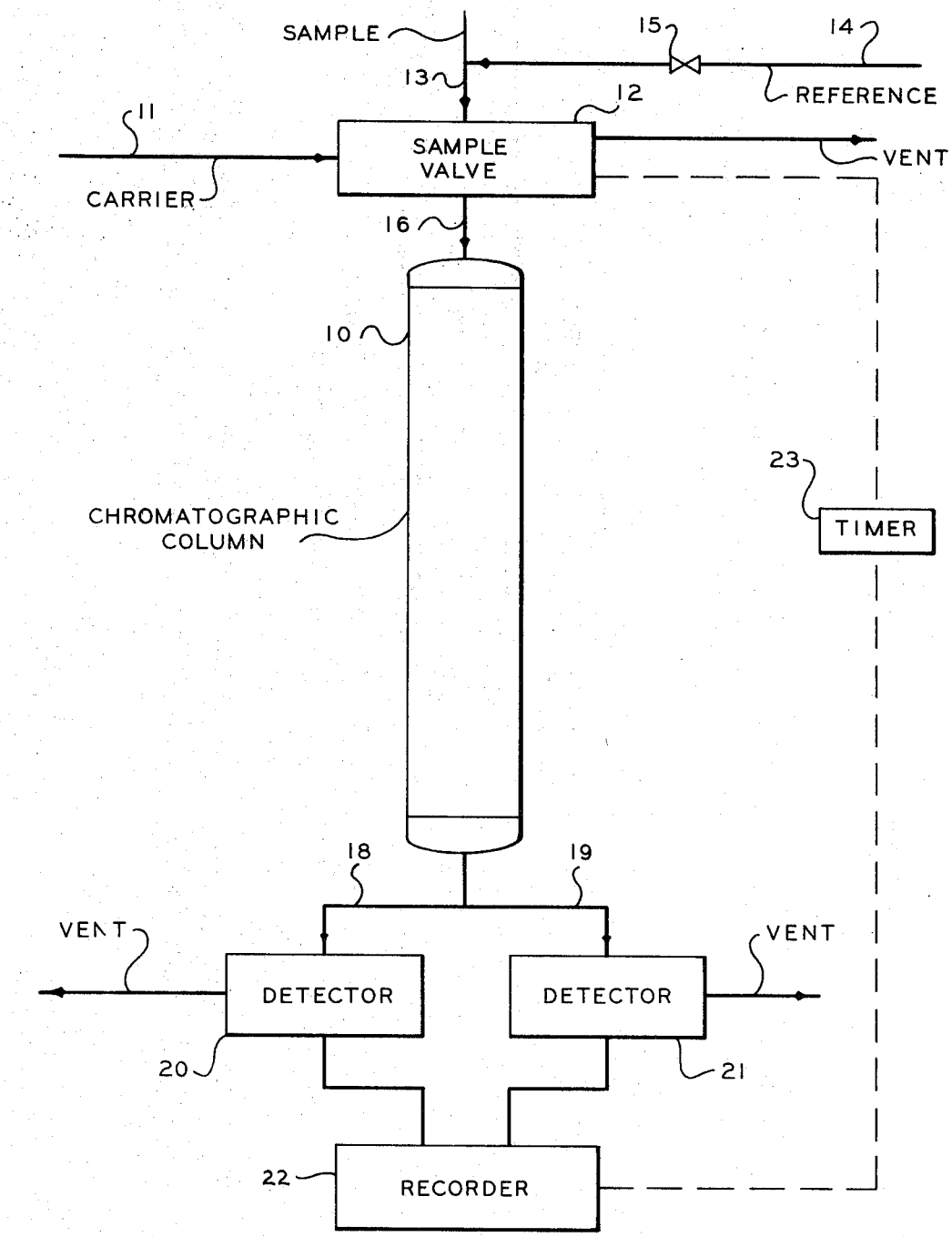
Figure 2:
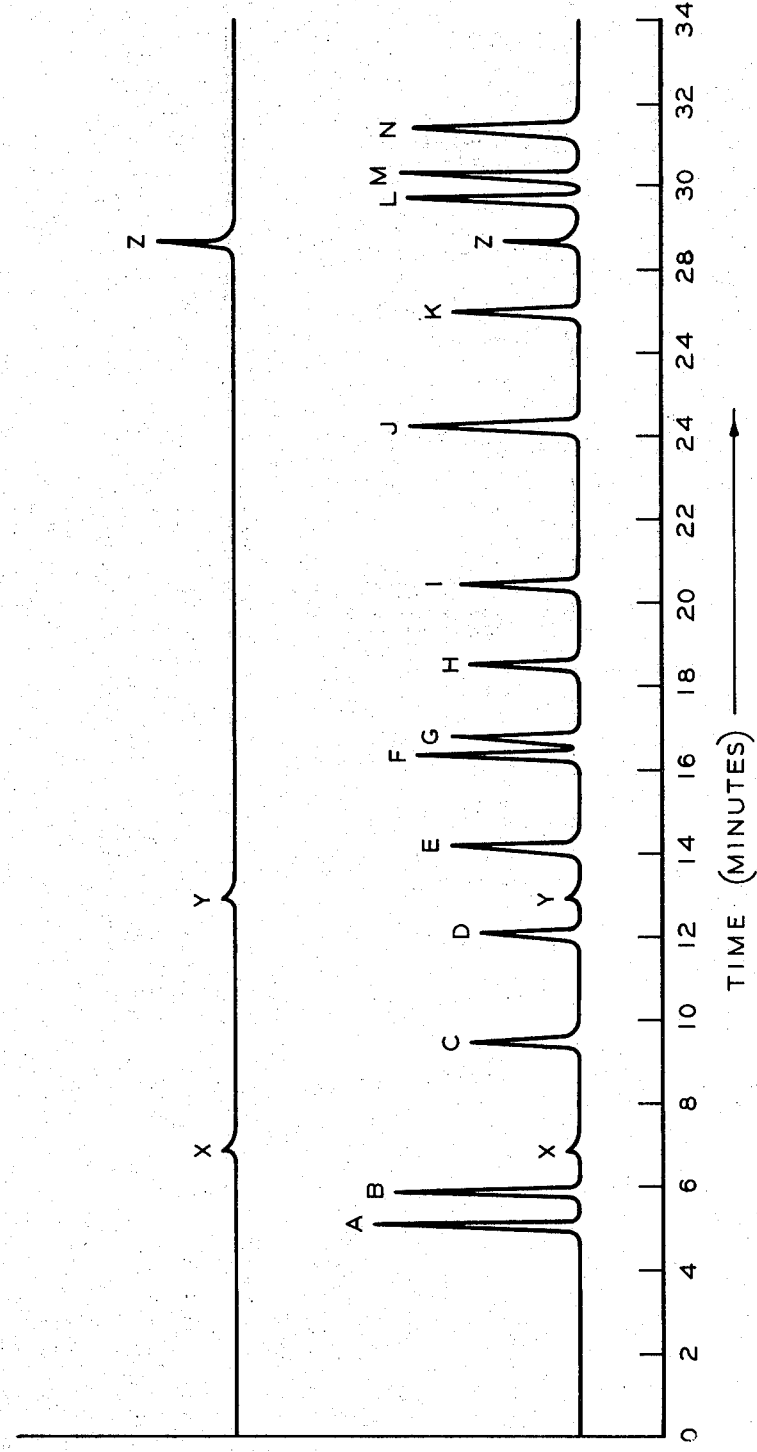

In the accompanying drawing, FIG. 1 is a schematic representation of a chromatographic analyzer which is employed to carry out the method of this invention. FIG. 2 illustrates typical signals received by the recorder of FIG. 1. FIG. 3 is a graphical representation of the calibration feature of the method of this invention.

Referring now to the drawing in detail and to FIG. 1 in particular, there is shown a conventional chromatographic column 10. A carrier gas is introduced through a conduit 11 which communicates with a sample valve 12. A sample of material to be analyzed is introduced into valve 12 through a conduit 13. A reference material, of the type to be described hereinafter, is introduced into conduit 13 through a conduit 14, the latter having a valve 15 therein. The outlet of sample valve 12 is connected by a conduit 16 to the inlet of column 10. Sample valve 12 can be any type of valve known in the art which permits selective introduction of a predetermined volume of sample material into column 10 when the valve is actuated. Both rotary and diaphragm operated valves are well known for this purpose.

The effluent from column 10 is directed through conduits 18 an 19 to respective detectors 20 and 21. Output signals from these two detectors are applied to respective channels of a recorder 22. In order to make repeated analyses, a timer 23 can be provided to actuate sample valve 12 repetitively. This timer can also apply a signal to recorder 22 each time the sample valve is actuated to introduce a sample of material into column 10, thereby establishing a zero time point on the recorder.

The reference material introduced through conduit 14 contains one or more constituents which can be identified positively by detector 21. For example, detector 21 can be a flame ionization detector of the type described in Analytical Chemistry, vol. 36, No. 8, July 1964, pages 1416 to 1421. This detector is sensitive only to compounds containing a halogen or phosphorus. The reference material introduced into conduit 14 contains one or more compounds which contain these elements. It is preferable to employ a plurality of such compounds in the reference material and to select these compounds so that they have retention times in column 10 which cover the range of retention times of the components of the sample to be analyzed. In another embodiment, detector 21 can be a radiation detector, in which case radioactive constituents can be employed as the reference material. Detector 20 is a conventional detector which is capable of measuring the components of the sample. Thermistors, ionization detectors, and hot wire detectors are examples of suitable instruments which can be employed as detector 20. In many cases, detector 20 is also capable of detecting the reference constituents.

In the operation of the analyzer of FIG. 1, a known reference sample which contains the various components that are anticipated to be present in the samples to be analyzed is first introduced into sample valve 12 through conduit 13. In addition, a reference material containing constituents which are detected by detector 21 is introduced into conduit 14 by opening valve 15. The resulting mixture constitutes the sample to the analyzer. Valve 12 is actuated to introduce a predetermined volume of this sample into column 10, and thereafter carrier gas is passed through column 10 to elute the constituents of the sample. Output signals from detectors 20 and 21 are applied to respective channels of recorder 22 to produce curves of the general type illustrated in FIG. 2. The upper curve of FIG. 2 represents the output signal from detector 21, and the lower curve represents the output signal from detector 20. Detector 20 can be a conventional flame detector, and detector 21 can be of the type described in the above-identified Analytical Chemistry article.

In order to describe the operation of this invention in greater detail, reference will be made to the analysis of a mixture of hydrocarbons containing dichloromethane, chloroform and chlorobenzene. In the resulting chromatograms, the peaks of FIG. 2 represent the following components.

| Component: | Peak |
|---|---|
| Isopentane | A |
| Normal pentane | B |
| 2-methylpentane | C |
| Normal hexane | D |
| Methylcyclopentane | E |
| Benzene | F |
| Cyclohexane | G |
| 3-methylhexane | H |
| Normal heptane | I |
| Toluene | J |
| Normal octane | K |
| Ethylbenzene | L |
| Para-xylene | M |
| Ortho-xylene | N |
| Dichloromethane | X |
| Chloroform | Y |
| Chlorobenzene | Z |

After the reference curves illustrated in FIG. 2 have been obtained from the sample materials of known compositions, a calibration chart is prepared in accordance with FIG. 3. This is accomplished by drawing a straight reference line 30 as a function of the retention times of the constituents X, Y and Z. As illustrated in FIG. 2, peaks for components X, Y and Z occur at respective times of approximately 8.9 minutes, 14.5 minutes and 29.1 minutes. Line 30 is a straight line drawn with any convenient arbitrary slope. Vertical and horizontal lines are drawn from the points representing components X, Y and Z, as illustrated. The retention times of constituents A to N are then added to line 30 by plotting points on the line at the respective retention times of these constituents. For example, constituent E occurs at a time of approximately 15.6 minutes, and component K occurs at approximately 27.4 minutes. When the individual components of the sample are so plotted, the calibration graph of FIG. 3 is obtained.

When an unknown material is to be analyzed, a sample thereof is introduced into sample valve 12 through conduit 13. An additional amount of the prior reference material (dichloromethane, chloroform and chlorobenzene) is introduced through conduit 14 and added to the sample. The chromatographic analyzer is then operated in the same manner to obtain additional curves corresponding to those shown in FIG. 2. However, it will be assumed that operating conditions in the column have changed slightly so that components X, Y, and Z do not occur at exactly the same times as they occurred when the calibration curve of FIG. 3 was prepared. It will be assumed, for example, that component X occurs at 9.8 minutes, component Y occurs at 16.0 minutes and component Z occurs at 32.0 minutes. It will also be assumed that the lower curve of FIG. 2 contains a peak at 27.3 minutes. In order to identify this peak, a comparison is made between the retention times of components Y and Z in the new curves and those of the standard reference curve. A fraction is formed, the numerator of which is the difference between the retention times of components Z and Y in the initial curve, and the denominator is equal to the difference between these retention times in the new curve. This fraction is equal to $$\frac{(29.1-14.5)}{(32.0-16.0)}=0.91$$

The new retention time of the unknown peak, 27.3 minutes, is multiplied by 0.91 to give the value 24.8. Reference is then made to the calibrated curve of FIG. 3. At a retention time of 24.8 minutes, there is shown component J. (toluene). This serves to identify the unknown peak as toluene. The other unknown peaks can be identified in a similar fashion. With respect to those peaks which occur between components X and Y, the retention times of these components X and Y are employed in a corresponding manner to establish the fraction by which the time of unknown peak is to be multiplied. Components corresponding to L, M, or N, which may occur at later times than component Z, can be identified by the fraction obtained from components Y and Z, as described above.

The foregoing procedure is quite useful when sample mixtures contain a substantial number of components. While the identification procedure can be carried out manually, in the manner described, it is possible to automate this procedure by applying the output signals from the detectors to a suitable computer. The quantities of the individual components can be measured in the usual manner either from the area under the curves or from the peak heights. The reference materials employed are usually selected so that their retention times encompass the range of the sample constituents. It is generally desirable to use a plurality of these constituents to provide closely spaced calibration ratios. However, the use of even a single identification constituent is helpful in many applications. In this procedure, the fraction employed to multiply by the unknown retention time is merely the ratio of the retention times of that sample constituent in the two curves.

While this invention has been described in conjunction with presently preferred embodiments it should be evident that it is not limited thereto.

What is claimed is:

1. In a process for analyzing a material containing a plurality of components by introducing a sample of the material into a chromatographic column, passing carrier fluid through the column to eluate the components in succession, and passing the column effluent to a detector which indicates the presence of the components; a calibration procedure which comprises introducing into said column with said sample a reference material containing at least one constituent, and passing effluent from the column to a second detector which is of such configuration as to provide a selective positive identification of said constituent in the presence of said components, whereby the time of elution of said constituent from said column can be determined for comparison with the elution times of said components.

2. The method of claim 1 wherein said reference material contains a plurality of constituents, each of which is detected selectively and positively by said second detector in the presence of said components.

3. The method of claim 1 wherein said constituent contains a halogen or phosphorous.

4. The method of claim 1 wherein said constituent is a radioactive material.

5. A process for analyzing an unknown material containing a plurality of components which comprises introducing a known sample of material containing said components and a reference material containing at least one constituent into a chromatographic column, passing carrier fluid through the column to elute said components and said constituent, passing effluent from the column to a first detector which indicates the present of at least said components, passing effluent from said column to a second detector which is of such configuration as to provide a selective positive identification of said constituent in the presence of said components, thereafter introducing into said column an unknown sample of material to be analyzed to detect the presence of said components therein, introducing into said column with said unknown sample a reference material containing at least said one constituent, passing effluent from said column to said first detector, and passing effluent from said column to said second detector, whereby the time of elution of said constituent can be determined from a comparison of the signals produced by said detectors.

References Cited

UNITED STATES PATENTS 3,126,731  3/164  Armstrong _____ 73—23.1

OTHER REFERENCES

"Use of Two or More Internal Standards in Gas Chromatography," appearing in Analytical Chemistry, vol. 31, No. 11, November 1959.

RICHARD C. QUEISSER, Primary Examiner

E. J. KOCH, Assistant Examiner